May 29, 1928.

F. TEISINGER 1,671,137

PISTON EXPANDER

Filed March 21, 1927

Inventor
Fred Teisinger,

By G.C. Kennedy.

Attorney

Patented May 29, 1928.

1,671,137

UNITED STATES PATENT OFFICE.

FRED TEISINGER, OF WATERLOO, IOWA, ASSIGNOR OF ONE-HALF TO CHARLES L. OSTRANDER, OF WATERLOO, IOWA.

PISTON EXPANDER.

Application filed March 21, 1927. Serial No. 177,141.

My invention relates to improvements in piston expanders, and the object of my improvement is to supply for use in expanding split pistons of internal combustion engines, means for expanding a piston in the circumferential region defined by a longitudinal split extending from its open end toward its other end, a device of this class constructed to operate in expanding this part of the piston equally throughout in the said defined region.

This object I have accomplished by the means which are hereinafter described and claimed, and which are illustrated in the accompanying drawings, it being understood that modifications of the elements of my device may be made without departing from the invention or the scope of its claims.

Figure 1:
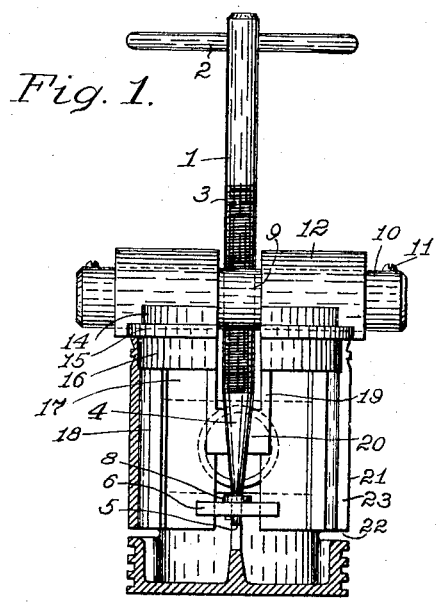
Figure 2:
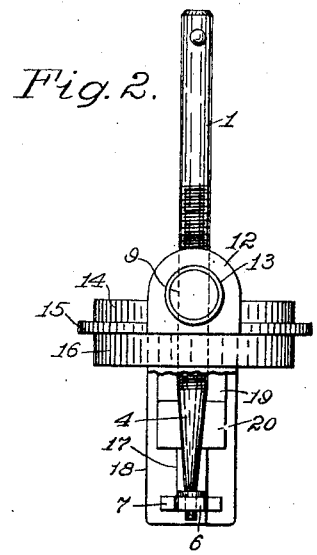
Figure 3:
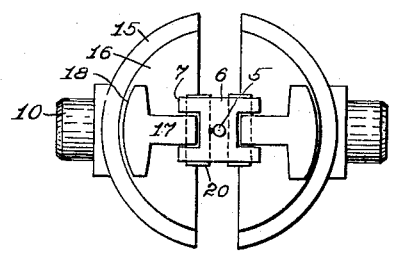

In said drawings, Fig. 1 is an elevation of my improved piston expander as operatively mounted within a split piston, the latter being shown in central vertical longitudinal section. Fig. 2 is an elevation of the expander alone, taken at an angle of ninety degrees from the elevation of said Fig. 1. Fig. 3 is an under plan view of said piston expander.

The numeral 21 denotes the hollow piston of an internal combustion engine such as is used in a well-known motor car, having one open and one closed end. This piston has at opposite sides circumferential slots 22 and at 23 a longitudinal slit which extends from the open end of the cylinder to one of said slots 22, the slit 23 therefore permitting of circumferential expansion of that part of the piston circumferentially which is defined by the limiting length of the slit 23.

My piston expander comprises an elongated cylindrical transverse guideway member 10 having stops 11 at both ends and having a transverse interiorly threaded opening 9 to seat a threaded rotatable shaft 1 at its threaded medial part 3, the upper end of the shaft being provided with a transverse handle 2 or other means thereon by which it may be conveniently manually rotated. The lower termination 4 of said shaft is coned and has a terminal cylindrical part 5 upon which an oppositely forked block 6 is loosely non-slidably mounted.

The numeral 12 denotes a like pair of guide members which are cylindrically apertured in alinement and mounted slidably upon the guideway member 10 at opposite sides of the shaft 1. Integral with each guide member 12 is a depending semi-cylindrical part 14, a wider semi-cylindrical stop member 15 and a lower semi-cylindrical diminished part 16. From each part 16 depends a projection 18 having a segmental cylindrical outer face to fit within the cylindrical inner wall of the piston 21, the semi-cylindrical part 16 seating in an annular depression at the open end of the piston, and the semi-cylindrical part 15 serving as a stop for the edge of the piston at its open end. The projection 18 has an integral inner medial longitudinal rib 17 spaced from and parallel with the cylindrical portion of the shaft 1. Integral with each rib 17 is an inwardly projecting medial boss 20 with upwardly and outwardly inclined inner edge of the same angular inclination as the intervening coned part 4 of said shaft seated contactingly between the synclinal edges of the opposed bosses 20. The furcations 7 of the block 6 loosely embrace the abutting parallel parts of said ribs 17 to be longitudinally slidable therealong while keeping said ribs and the projections 18 alined transversely with each other. The block 6 is held on the shaft part 5 non-slidably between a fixed collar 8 and a stop-pin in the shaft below said block 6.

In case of wear upon the outer face of the piston 21 reducing its diameter unsuitably to properly slidably fit the inner cylindrical wall of an engine cylinder, my device may be used to expand it. The piston should be heated to a sufficient amount to thus render its molecules relatively movable to the proper amount, and the semi-cylindrical parts 16 with their projections 18 being fitted within the open end of the piston, the parts 18 extending to the circumferential slots 22, the shaft 1 may be rotated to cause the coned part 4 to slidingly press apart the synclinal edges of the bosses 20 with the projections 18, thus expanding that part of the piston circumferentially which is defined by the length of the longitudinal slot 23. It will be noted that an important feature of this invention is the provision of the strong assemblage of the transverse guideway body 10 with the guides 12 mounted slidably thereon, whereby when the projections 18 are forced apart by the coned part 4 of the shaft 1, the projections 18 are through their lengths kept parallel with each other and with the piston wall being treated, and so that the expansion of the latter is equal throughout its extent as defined by the length of said split 23. It will be understood that while the split 23 may be longitudinal it may, as in the usual practise, be slightly inclined to one side, to thus prevent scoring of the wall of a cylinder.

When the piston wall is cooled sufficiently, it will have taken a permanent expanded set, and then the expander device may be easily removed, by rotating the shaft 1 oppositely, thus releasing the projections from the piston.

Having described my invention, what I claim as new, and desire to secure by Letters Patent, is:

1. In combination, an elongated guideway member having a transverse interiorly threaded aperture, a medially threaded shaft traversing and with its threads meshed with the threads of said aperture walls, said shaft having a conical termination, guides apertured to slidingly fit upon said member at opposite sides of said shaft and having parallel projections provided with synclinal inwardly directed bosses to contact slidingly with said conical termination, whereby when the shaft is rotated in one direction the conical termination thereof coacts slidingly with said synclinal bosses to thrust apart said projections, the latter being maintained in parallel relation by the guides as mounted upon said guideway member.

2. In combination, a transverse guideway, said guideway having a medial interiorly apertured transverse aperture, a medially threaded rotatable shaft mounted to traverse and be in mesh with said threaded aperture wall, said shaft having a conical part with a cylindrical termination, guides apertured to slidingly fit said guideway on opposite sides of said shaft and having on their inner opposed faces parallel longitudinal ribs which have opposed medial bosses with opposed synclinal faces in contact with opposite sides of the conical part of said shaft, and a block apertured to be non-slidably rotatably mounted upon said cylindrical termination with its end furcations embracing said longitudinal ribs loosely and slidably.

3. In combination, a transverse guideway, said guideway having a medial interiorly apertured transverse aperture, a medially threaded rotatable shaft mounted to traverse said aperture meshing with its threads, said shaft having a conical part with a cylindrical termination, guides apertured to fit upon said guideway slidably and having parallel projections with outer segmentally cylindrical walls and having medial longitudinal opposed ribs on their inner faces which ribs have integral opposed synclinal projections contacting with said conical shaft part in longitudinal contact therewith, said projections having outwardly projecting stop parts at their connections with said guides, and an oppositely forked block having a medial aperture whereby it is mounted non-slidably and rotatably upon said cylindrical termination with its furcations loosely slidably embracing said ribs to keep said projections from relative sidewise displacements.

In testimony whereof I affix my signature.

FRED TEISINGER.